(12) United States Patent
Endo

(10) Patent No.: US 7,597,089 B2
(45) Date of Patent: Oct. 6, 2009

(54) ENGINE WITH EGR SYSTEM

(75) Inventor: Hiroyuki Endo, Nagasaki-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 84 days.

(21) Appl. No.: 11/976,534

(22) Filed: Oct. 25, 2007

(65) Prior Publication Data
US 2008/0283028 A1 Nov. 20, 2008

(30) Foreign Application Priority Data
Jan. 9, 2007 (JP) ............................. 2007-001706

(51) Int. Cl.
*F02B 47/08* (2006.01)
*F02B 47/00* (2006.01)
(52) U.S. Cl. ............................. 123/568.14; 123/568.12
(58) Field of Classification Search ............ 123/568.14, 123/568.12, 568.19, 568.11; 60/605.2, 602, 60/295, 297, 311
See application file for complete search history.

(56) References Cited

U.S. PATENT DOCUMENTS

2005/0022519 A1* 2/2005 Shirakawa ................... 60/297
2005/0027431 A1* 2/2005 Todoroki et al. ............ 701/105
2006/0112679 A1* 6/2006 Kojima et al. ................. 60/278

FOREIGN PATENT DOCUMENTS

| JP | 07-133726 | 5/1995 |
|----|-----------|--------|
| JP | 10-252512 | 9/1998 |
| JP | 2000-204984 | 7/2000 |
| JP | 2006-226205 | 8/2006 |

* cited by examiner

*Primary Examiner*—Mahmoud Gimie
(74) *Attorney, Agent, or Firm*—Wenderoth, Lind & Ponack, L.L.P.

(57) ABSTRACT

A 4-stroke cycle engine has an EGR system equipped with a particulate filter, an external EGR system, and an exhaust valve sub-lift type internal EGR system. With the engine, reduction of NOx emission by EGR can be achieved without incurring a deterioration in engine durability by enabling operation of the engine with the proper EGR rate over all operating ranges of the engine by making it possible to compensate for reduction in EGR amounts due to a reduced DPF pressure difference which occurs when the recovering operation of the DPF is performed.

4 Claims, 5 Drawing Sheets

ENGINE WITH EGR SYSTEM

BACKGROUND OF THE INVENTION

1. Field of the Invention

The present invention relates primarily to 4-stroke cycle diesel engines, and particularly, engines equipped with a DPF (diesel particulate filter), variable geometry turbocharger, and EGR (Exhaust Gas Recirculation) system which is composed such that a fraction of the exhaust gas joins together with the charged air in the cylinder of the engine by allowing the exhaust valve to lift a little in the suction stroke.

2. Description of the Related Art

There are 4-stroke cycle diesel engines and 4-stroke cycle gas engines that adopt an internal EGR system in which a fraction of the exhaust gas joins together with the charged air in the cylinders of the engine by allowing the exhaust valve to lift by a small lift in the suction stroke. This is called an exhaust valve sub-lift type internal EGR system.

The exhaust valve sub-lift type internal EGR system will be explained with reference to FIG. 5. In FIG. 5, the valve lift curve of the exhaust valve 7 and that of the inlet valve 5 versus crank angle are indicated by Es and In respectively. The exhaust valve lift Ex in the exhaust stroke is called here as the main exhaust valve lift. The exhaust valve 7 is lifted again by a small lift Hs in the suction stroke as shown by sub-lift Es of the exhaust valve 7. The exhaust valve sub-lift begins after closing of the main exhaust valve lift Ex. By lifting the exhaust valve by a small lift Hs in the suction stroke, a fraction of the exhaust gas in the exhaust passage 6 flows back into the cylinder. Thus, internal EGR is performed and generation Nox is reduced.

There are disclosed several types of internal EGR systems of internal combustion engines such as Japanese Laid-Open Patent Application No. 2006-226205 (patent literature 1), No. 7-133726 (patent literature 2), No. 10-252512 (patent literature 3), and No. 2000-204984 (patent literature 4), for example. The engine disclosed in patent literature 1 is provided with a DPF, an internal EGR system, and an external EGR system which includes an EGR conduit for introducing a fraction of exhaust gas in the exhaust pipe to the inlet passage and an EGR valve for controlling openings of the EGR conduit. The proportion of the internal EGR and external EGR is controlled to stabilize combustion and prevent the occurrence of rotational fluctuation of the engine when engine operation condition is returned from DPF recovering operation to low load operation.

In patent literature 2 is disclosed an inlet air control system in which an inlet control valve is provided in the inlet air passage. Negative pressure is formed in the inlet air passage by closing the inlet control valve and inlet valve in this order just before the end of the suction stroke. When the inlet valve is opened before the inlet control valve is opened just before the end of exhaust stroke, combustion gas in the cylinder flows into the inlet passage retained in negative pressure aided by the upward movement of the piston. The combustion gas flowed into the inlet passage flows into the cylinder together inlet air in the suction stroke as EGR gas. In this way, internal EGR is performed. By controlling negative pressure in the inlet passage in accordance with engine operating conditions, such as engine load and rotation speed, through controlling the inlet control valve or other means, the rate of EGR gas can be controlled.

According to the art disclosed in patent literature 3, the valve overlap period of the inlet and exhaust valves is increased to increase EGR amounts as engine loads decrease. By this heating effect of inlet air by EGR being increased, autoignition is enhanced, and a stable combustion range is widened when the engine is operated with a light load.

According to the art disclosed in patent literature 4, a variable valve timing mechanism and an exhaust throttle valve are provided, and when a large amount of internal EGR is required, inlet and exhaust valve opening timings are advanced together by means of a variable valve timing mechanism and further the amount of the exhaust throttle valve opening is decreased in order to allow a larger fraction of exhaust gas to be introduced into the engine cylinder.

In an engine equipped with the exhaust valve sub-lift type internal EGR system, the exhaust valve is lifted again in the inlet stroke by the small lift (Hs) as shown in FIG. 5 so that a fraction of exhaust gas in the exhaust passage flows back into the cylinder to be mixed with the charged air. When the flow resistance in the DPF located downstream of the turbocharger increases due to deposition of particulate matter, exhaust backpressure increases and inlet air flow to the engine decreases. As a result, excessive exhaust gas recirculation occurs, which enhances generation of particulate matter mainly composed of carbon particles and deposition of particulate matter in the DPF is enhanced. Further, when the internal EGR rate is excessively large, combustion temperature and exhaust temperature increase. When the exhaust temperature exceeds an upper limit, thermal load of the engine increases, and the increase in combustion temperature enhances generation of NOx and the effect of reducing NOx generation by EGR is decreased by the increased combustion temperature.

Particularly, with an engine provided with a particulate filter, when deposition of particulate matter in the particulate filter increases, exhaust backpressure increases due to increased flow resistance in the particulate filter. The increase in exhaust backpressure induces a decrease in air supply which induces an increase in internal EGR rate. By the increased internal EGR, combustion temperature and exhaust temperature increase and fear of inducing the problems as mentioned above is increased.

To solve the problems, it is conceivable to control by adjusting the exhaust valve sub-lift amount Es so that an internal EGR rate proper for a DPF difference pressure is attained, the internal EGR rate being a reference internal EGR rate determined in accordance with engine operation conditions, such as engine loads and engine rotation speed.

However, even when EGR rates are controlled as mentioned above, when DPF pressure difference is decreased by recovering operation of the DPF (burning operation of the particulate matter deposited in the DPF), internal EGR rates become lower than the reference internal EGR rate due to decreased DPF pressure difference. In this case, a problem arises that it is necessary to compensate for the decrease of the internal EGR rate.

According to the art of patent literature 1, a DPF, an internal EGR system, and an external EGR system are provided. Controlling of proportion of the internal EGR and external EGR to stabilize combustion and prevent the occurrence of rotational fluctuation of the engine when the engine operation condition is returned from DPF recovering operation to low load operation is disclosed in the literature, however a means to solve the problems mentioned above is not disclosed.

According to the art of patent literature 2, an inlet control valve is provided in the inlet passage and internal EGR amounts are controlled by controlling negative pressure generated in the inlet passage between the inlet control valve and inlet valve, and a means to solve the problems mentioned above is not disclosed.

In patent literature 3 is disclosed a compression ignition internal combustion engine, in which heating effect of inlet air by EGR is increased through increasing EGR amounts by increasing valve overlap period of the inlet and exhaust valves as engine loads decrease, and a means to solve the problems mentioned above is not disclosed.

According to the art disclosed in patent literature 4, inlet and exhaust valve opening timings are advanced together and further the amount of the exhaust throttle valve opening is decreased in order to allow a larger fraction of exhaust gas to be introduced into the engine cylinder when a large amount of internal EGR is required, and a means to solve the problems mentioned above is not disclosed.

SUMMARY OF THE INVENTION

The present invention was made in light of problems mentioned above. The invention relates particularly to a 4-stroke cycle engine provided with a particulate filter, an external EGR system comprising an EGR conduit and EGR valve, and an internal EGR system, and the object of the invention is to make it possible to compensate for reduction in EGR amounts due to reduction in pressure difference in the particulate filter which occurs when recovering operation of the particulate filter is performed.

According to the invention, reduction of NOx emission by EGR can be achieved without incurring deterioration in engine durability by enabling operation of the engine with proper EGR rate all over the operating ranges of the engine.

The engine according to the invention is provided with a particulate filter for removing particulate matter mainly consisting of carbon particles in the exhaust gas, an EGR (exhaust gas recirculation) conduit for introducing a fraction of exhaust gas flowing through an exhaust gas passage to an inlet air passage of the engine, and an EGR valve for controlling valve opening of the EGR valve. The engine is constructed such that exhaust valve sub-lift type internal EGR is performed by allowing an exhaust valve or valves to lift by a small lift in the intake stroke to allow a fraction of exhaust gas in a intake passage in a cylinder of the engine to flow back into the combustion chamber in the cylinder.

The engine is provided with a means for detecting exhaust gas pressure difference in the particulate filter, and a controller, in which reference values of pressure difference in the particulate filter commensurate with reference values of EGR rate of the internal EGR are established and an EGR amount-to-be-corrected is calculated based on pressure difference deviation between the detected pressure difference and the reference values of pressure difference in the particulate filter, and which controls valve opening of the EGR valve in accordance with the calculated EGR amount-to-be-corrected.

In the invention, it is preferable that (1) the EGR controller controls to increase valve opening of the EGR valve by an amount commensurate with the calculated EGR amount-to-be-corrected, and (2) the EGR controller controls valve opening of the EGR valve and valve opening of a throttle valve for controlling flow rates of air supply in accordance with the EGR amount-to-be-corrected.

It is suitable to compose such that a lower temperature EGR conduit and a higher temperature EGR conduit are provided parallel to each other between the exhaust gas passage and the inlet air passage, an EGR cooler for cooling exhaust gas flowing through the lower temperature EGR conduit and a lower temperature EGR valve are provided to the lower temperature EGR conduit, and a higher EGR conduit valve is provided to the higher temperature EGR conduit, whereby valve opening of the higher temperature EGR valve is controlled by the EGR controller.

DETAILED DESCRIPTION OF THE PREFERRED EMBODIMENTS

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only and not as limitative of the scope of the present invention.

Figure 1:
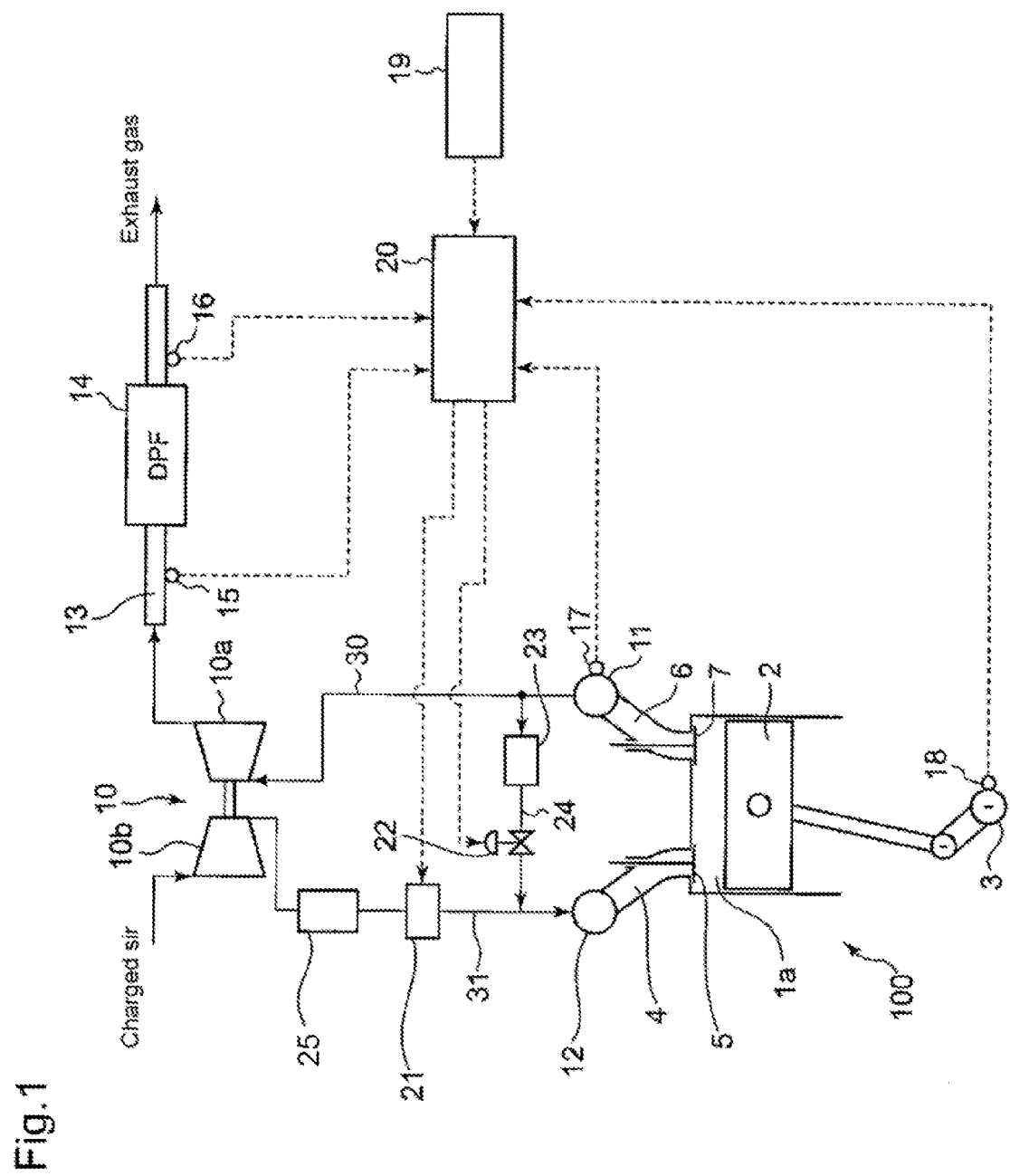
FIG. 1 is a schematic representation of overall construction of a 4-stroke cycle diesel engine equipped with an internal EGR system of the first embodiment of the present invention.

FIG. 1 is a schematic representation of overall construction of a 4-stroke cycle diesel engine equipped with an internal EGR system of the first embodiment of the present invention.

Referring to FIG. 1, reference numeral 100 is a 4-stoke cycle engine, 1a is a combustion chamber in a cylinder 1 of the engine 100, 2 is a piston, 3 is a crankshaft.

Reference numeral 4 and 6 are an inlet and outlet passage respectively in a cylinder head of the engine. Reference numerals 5 and 7 are an inlet and exhaust valve respectively. Reference numerals 11 and 12 are an exhaust and inlet manifold respectively. Reference numeral 10 is a turbocharger composed of an exhaust turbine 10a and an air compressor lob. Reference numeral 25 is an air cooler for cooling the pressurized air from the compressor lob.

The turbocharger 10 is a variable geometry (VG) turbocharger equipped with a nozzle vane moving mechanism for varying nozzle angle. The turbine 10a is driven by the exhaust gas flowing out from the exhaust manifold 11 to enter the turbine 10a and the compressor lob connected to the turbine 10a is driven by the turbine 10a to supply pressurized air to the inlet manifold 12. The charge air pressurized by the compressor lob of the turbocharger 10 is cooled by the air cooler 25, adjusted in flow rate by a throttle valve 21, and charged into the combustion chamber 1a via an inlet pipe 31, the inlet manifold 12, and the inlet passage 4 when the inlet valve 5 is opened in the intake stroke.

The combustion gas in the combustion chamber 1a is exhausted from the combustion chamber 1a as exhaust gas through the exhaust passage 6, exhaust manifold 11, and exhaust pipe 30, and enters the turbine 10a to drive it.

A particulate filter (DPF) 14 for removing particulate matter in the exhaust gas is provided in the turbine outlet side exhaust pipe 13 connected to the exhaust outlet of the turbine 10a.

Exhaust gas from the turbine 10a flows through the outlet side exhaust pipe 13 and enters the DPF 14 where particulate matter is removed, then the exhaust gas is cleaned by means of an exhaust gas decontamination device and exhausted into the atmosphere.

The inlet valve 5 and exhaust valve 7 are driven by an inlet cam and exhaust cam to open and close the inlet and exhaust passage 4 and 6 respectively by the rotation of the cams driven by the crankshaft 3.

The present invention relates to an improvement of the EGR system of the 4-stroke cycle engine composed as described above.

The First Embodiment

Referring to FIG. 1 showing a first embodiment of the invention, a detected load and rotation speed of the engine 100 are inputted from a load detector 19 and a rotation speed detector 18 to an EGR controller 20.

Pressure sensors 15 and 16 are located at the exhaust gas inlet and outlet of the DPF 14. Exhaust gas pressures detected by the pressure sensors 15 and 16 are sent to the EGR controller.

An exhaust gas temperature sensor 17 for detecting the temperature of exhaust gas from the engine 100 is provided as necessary. The exhaust gas temperature sensor 17 detects the temperature of exhaust gas in the exhaust manifold 11 as the exhaust gas temperature of the engine and the detected temperature is inputted to the EGR controller.

In FIG. 1, reference numeral 24 is a lower temperature EGR conduit branching from the turbine inlet side exhaust pipe 30 and connecting to the inlet pipe 31 in the downstream section from the throttle valve 21.

Reference numeral 23 is an EGR cooler for cooling exhaust gas flowing in the lower temperature EGR conduit 24. Reference numeral 22 is a lower temperature EGR valve for adjusting flow area of the lower temperature EGR conduit 24.

The EGR controller 20 controls the amount of opening of the lower temperature EGR valve to control the flow rate of external EGR and the amount of opening of the throttle valve 21 to control the flow rate of air supply.

The Second Embodiment

Figure 2:
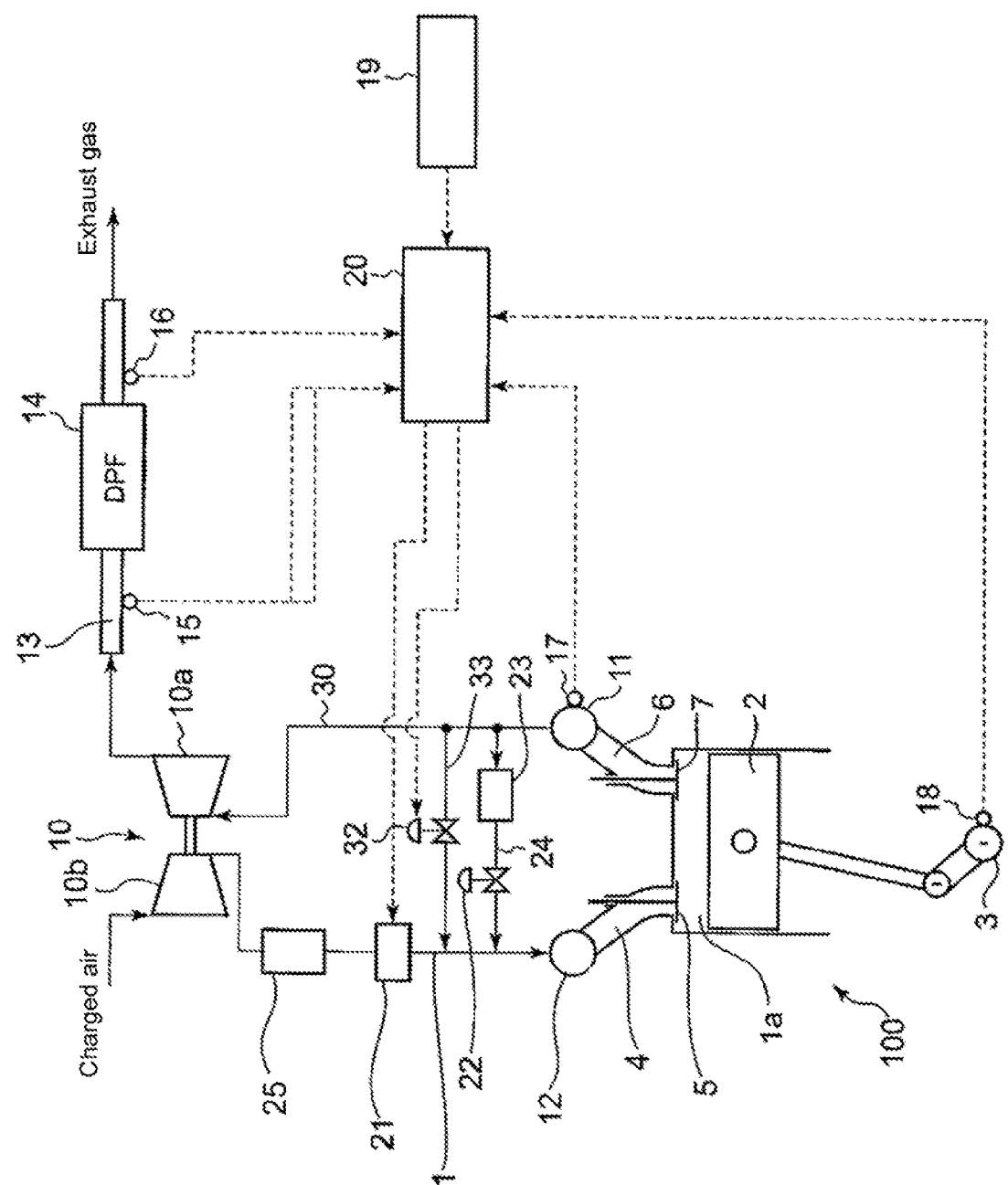
FIG. 2 is a schematic representation as in FIG. 1 of the second embodiment.

FIG. 2 is a schematic representation of overall construction of a 4-stroke cycle diesel engine equipped with an internal EGR system of the second embodiment of the present invention.

In the second embodiment, a lower temperature EGR conduit 24 and a higher temperature EGR conduit 33 are provided between the exhaust pipe 30 and inlet pipe 31 in parallel to each other.

In the lower temperature EGR conduit 24 are provided an EGR cooler 23 for cooling exhaust gas for recirculation and a lower temperature EGR valve 22 for adjusting flow area of the lower temperature EGR conduit 24 as are in the first embodiment. The higher temperature EGR conduit 33 is not provided with any cooler for cooling exhaust gas for recirculation. A higher temperature EGR valve 32 is provided to adjust flow area of the higher temperature EGR conduit 33. The amount of opening of the higher temperature EGR valve 32 is controlled by the EGR controller 20.

Next, EGR control operation of the first and second embodiments of the invention will be explained referring the control black diagram of FIG. 3.

Figure 3:
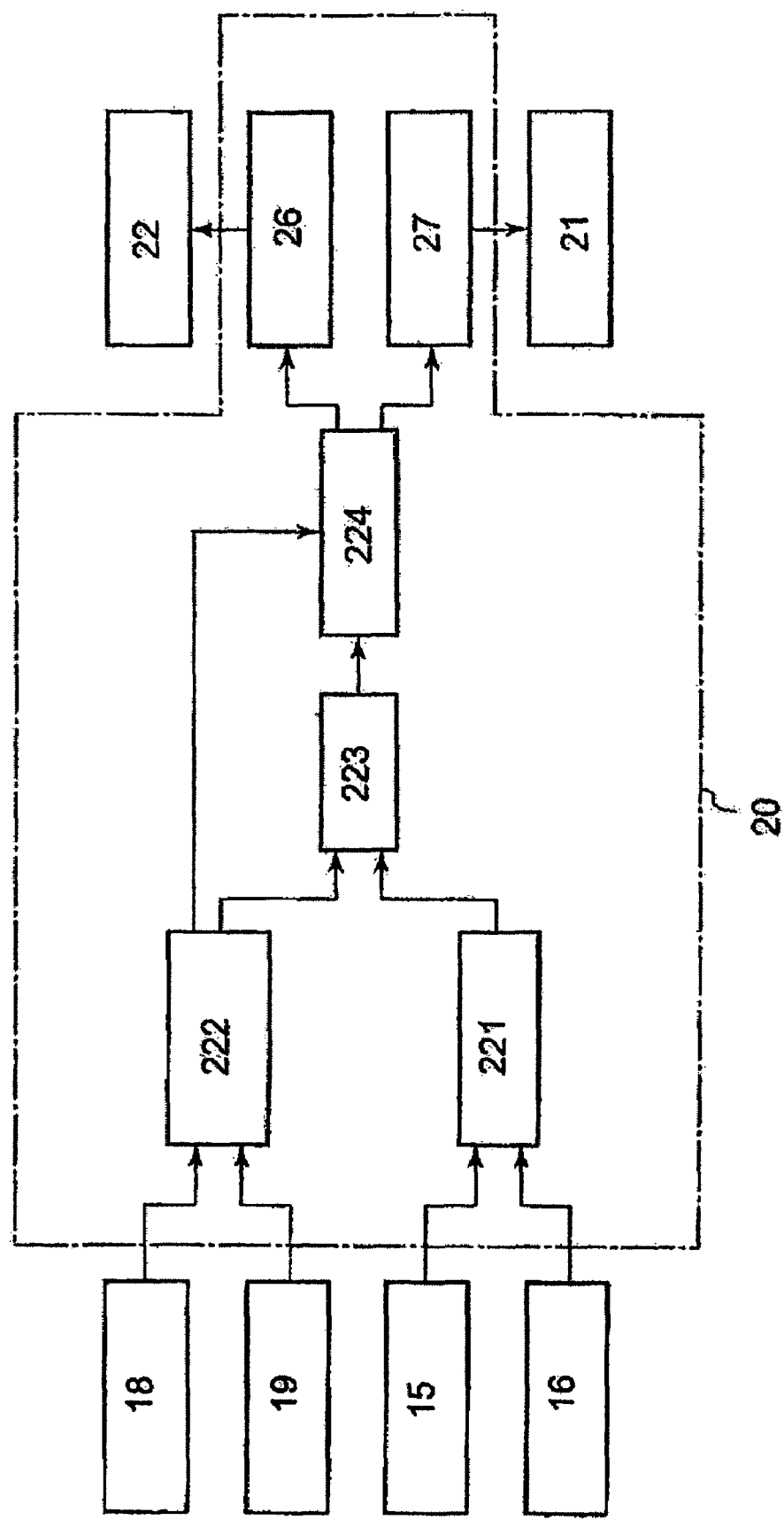
FIG. 3 is a control block diagram of the second embodiment.

In FIG. 3, the engine load and rotation speed detected by the load detector 19 and rotation speed detector 18 are inputted to a reference pressure difference/reference internal EGR rate setting means 222 in the EGR controller 20. The inlet and outlet pressure detected by the DPF inlet pressure detector 15 and DPF outlet pressure detector 16 are inputted to a DPF pressure difference calculation means 221. In the DPF difference pressure calculation means 221, DPF pressure difference (DPF inlet pressure–DPF outlet pressure) is calculated. The calculated DPF pressure difference is inputted to a pressure difference deviation calculation means 223.

In the reference pressure difference/reference internal EGR rate setting means 222 are established reference values of DPF pressure difference commensurate with engine exhaust pressures depending on engine rotation speed and loads.

Figure 4:
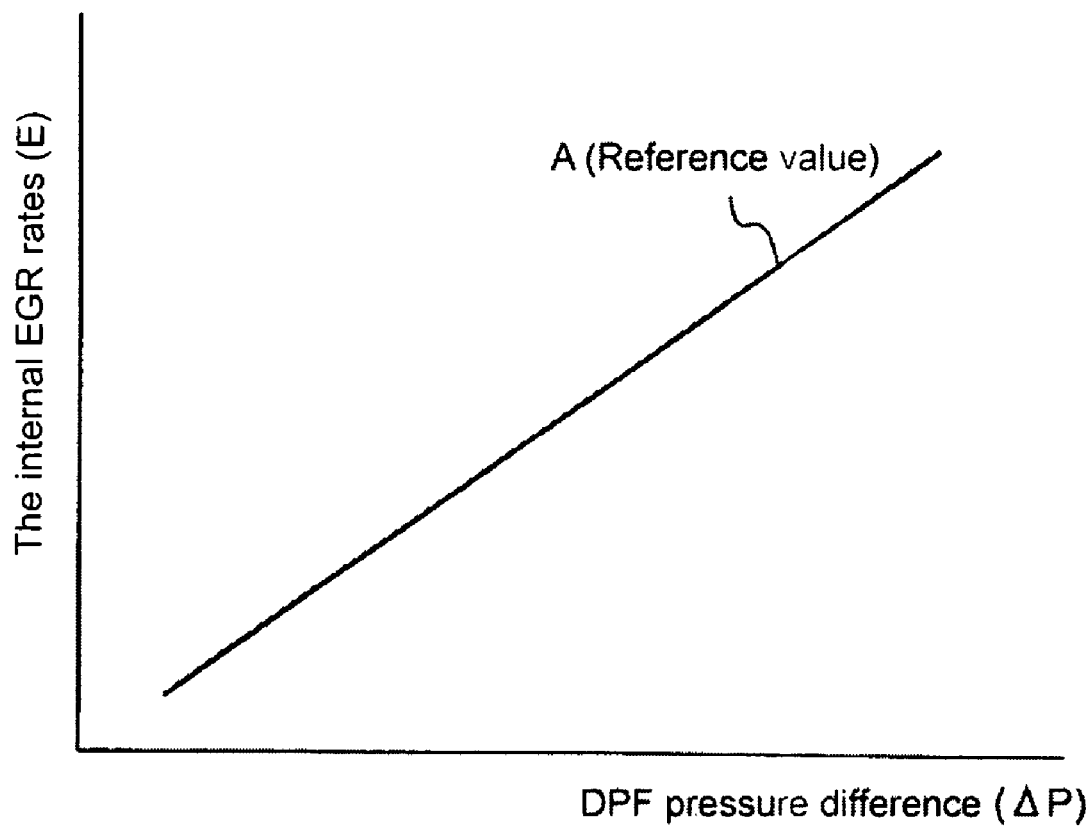
FIG. 4 is a graph showing a relation between DPF pressure difference and internal EGR rates.
Figure 5:
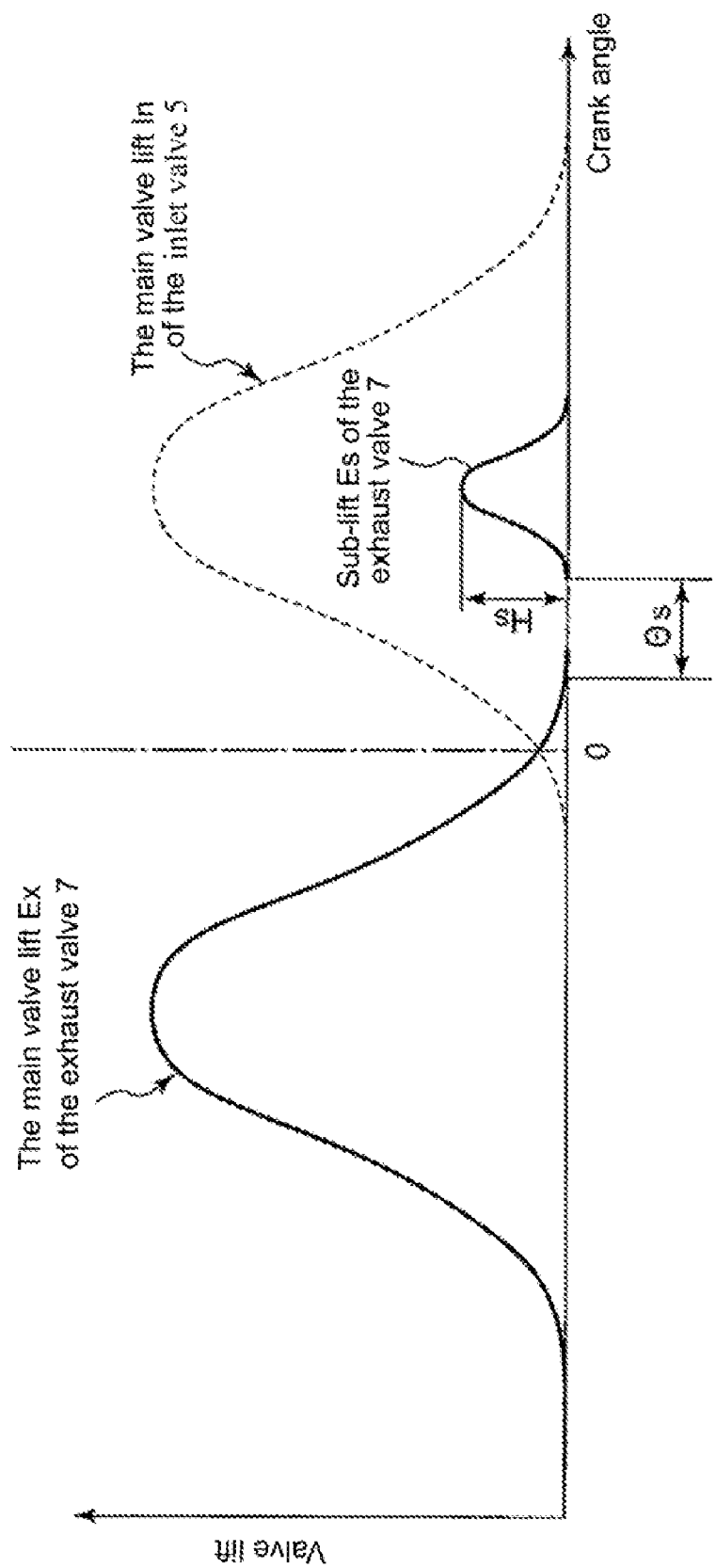
FIG. 5 is a graph showing exhaust and inlet valve lifts versus crank angle of a 4-stroke cycle engine equipped with the exhaust valve sub-lift type internal EGR system.

In FIG. 4 is shown a relation between internal EGR rates (reference internal EGR rates) and DPF pressures difference. In the reference pressure difference/reference internal EGR rate setting means 222 is established the relation shown in FIG. 4.

As shown in FIG. 4, the internal EGR rate (reference internal EGR rate) increases proportionally as the DPF pressure difference increases. A line A in FIG. 4 shows reference value of internal EGR rates (reference internal EGR rates) commensurate with DPF pressure difference which depends on engine rotation speed and loads.

In the pressure difference deviation calculation means 223, a reference value of DPF pressure difference commensurate with the detected engine rotation speed and load is selected from the DPF reference pressure difference established in the reference pressure difference/reference internal EGR rate setting means 222. Then, the pressure difference deviation calculation means 223 calculates DPF pressure difference deviation which is a difference between the reference value of the DPF pressure difference and the calculated (detected) value of the DPF pressure difference, and the deviation is inputted to an EGR amount-to-be-corrected calculation means 224. In the EGR amount-to-be-corrected calculation means 224, an EGR amount-to-be-corrected commensurate with the DPF pressure difference deviation is calculated based on the relation between DPF pressure difference and internal EGR rate, the relation being shown in FIG. 4 and established in the reference pressure difference/reference internal EGR rate setting means 222. The calculated EGR amount-to-be-corrected is inputted to an EGR valve opening calculation means 26 and a throttle valve opening calculation means 27.

In the EGR valve opening calculation means 26, an amount-to-be-increased of opening of the lower temperature EGR valve 22 (in the case of the first embodiment), or an amount-to-be-increased of opening of the higher temperature EGR valve 32 (in the case of the second embodiment) is calculated. The amount of opening of the lower temperature EGR valve 22 (in the case of the first embodiment) or that of the higher temperature EGR valve 32 in the case of the second embodiment) is increased by the calculated amount-to-be-increased of valve opening. Further, the amount of opening of the throttle valve 21 is controlled to be decreased in accordance with the increased vale opening of the lower temperature EGR valve 22 (in the case of the first embodiment) or the increased vale opening of the higher temperature EGR valve 32 (in the case of the second embodiment).

By controlling as mentioned above, the engine 100 will be operated with EGR rates proper for operating conditions thereof.

According to the first and second embodiments, DPF reference pressure differences commensurate internal EGR reference rates are set in the EGR controller 20, an EGR amount-to-be-corrected is calculated in the EGR controller 20 based on pressure difference deviation between detected DPF pressure difference and the DPF reference pressure difference, and the amount of opening of the EGR valve of external EGR (opening of the lower temperature EGR valve 22 in the case of the first embodiment, and opening of the higher temperature EGR valve 32 in the case of the second embodiment) is controlled to control external EGR amounts. Further, valve opening of the EGR valve 22 (in the case of the first embodiment) or EGR valve 32 (in the case of the first embodiment) are increased by an amount commensurate with the calculated EGR amount-to-be-corrected as DPF pressure difference decreases, and valve opening of the throttle valve 21 is controlled in association with valve opening of the EGR valve 22 and 32 depending on the EGR amount-to-be-corrected. When detected DPF pressure difference becomes lower than the DPF reference pressure difference by recovering operation of the DPF 14, An EGR amount-to-be-corrected is calculated based on pressure difference deviation between detected DPF pressure difference and the DPF reference pressure difference, and the amount of opening of the EGR valve 22 and 32 is increased by an amount commensurate with the calculated EGR amount-to-be-corrected, or the amount of opening of the EGR valve 22 or 32 is increased and at the same time the amount of opening of the throttle valve 21 is decreased by amounts commensurate with the calculated EGR amount-to-be-corrected. In this way, total EGR rate of the sum of the internal EGR rate and external EGR rate can be maintained at target rates of EGR in accordance with operation conditions of the engine 100 even when pressure difference in the DPF 14 has changed without incurring deterioration in durability of the engine with NOx deducing effect by EGR maintained.

According to the second embodiment of the invention, compensation of EGR rate for reduction in the internal EGR rate caused by decreased DPF pressure difference can be performed by controlling EGR amounts of the higher temperature EGR valve 32 without cooling recirculation exhaust gas. Therefore, control of EGR rates can be performed more exactly as compared with the first embodiment in which cooled recirculation exhaust gas is controlled by the lower temperature EGR valve 22.

According to the invention, in a 4-stroke cycle engine provided with a DPF, external EGR system, and exhaust valve sub-lift type internal EGR system, reduction in EGR rate due to reduction in DPF difference pressure caused by recovering operation, etc. of the DPF can be compensated for. Further, according to the invention, engine operation with proper EGR rate is possible in whole operating range of the engine. Therefore, engines with EGR system can be provided which achieves NOx reduction performance by EGR without suffering deterioration in engine durability.

The invention claimed is:

1. An engine with an EGR (exhaust gas recirculation) system comprising:

a particulate filter;

an EGR conduit for introducing a fraction of exhaust gas flowing through an exhaust gas passage to an inlet air passage of the engine;

an EGR valve for controlling opening and closing of the EGR conduit;

a means for detecting an exhaust gas pressure difference in the particulate filter; and a controller, in which reference values of pressure difference in the particulate filter commensurate with reference values of EGR rate of internal EGR are established, for calculating an EGR amount-to-be-corrected based on a pressure difference deviation between the detected exhaust gas pressure difference and the reference values of pressure difference in the particulate filter, and controlling valve opening of the EGR valve in accordance with the calculated EGR amount-to-be-corrected, wherein the controller performs exhaust valve sub-lift type internal EGR by allowing an exhaust valve or exhaust valves to lift by a small lift in an intake stroke to allow a fraction of exhaust gas in an intake passage in a cylinder of the engine to flow back into the cylinder.

2. An engine with EGR system according to claim 1, wherein the controller controls an increase in valve opening of the EGR valve by an amount commensurate with the calculated EGR amount-to-be-corrected.

3. An engine with EGR system according to claim 1, wherein the controller controls valve opening of the EGR valve and valve opening of a throttle valve for controlling flow rates of air supply in accordance with the EGR amount-to-be-corrected.

4. An engine with EGR system according to claim 1, wherein the EGR conduit comprises a lower temperature EGR conduit and a higher temperature EGR conduit provided parallel to each other between the exhaust gas passage and the inlet air passage, wherein the engine further comprises:

an EGR cooler, provided to the lower temperature EGR conduit, for cooling exhaust gas flowing through the lower temperature EGR conduit;

a lower temperature EGR valve provided to the lower temperature EGR conduit; and a higher EGR conduit valve provided to the higher temperature EGR conduit, and wherein the controller controls valve opening of the higher temperature EGR valve.

* * * * *